United States Patent
Jeong

(10) Patent No.: US 8,702,559 B2
(45) Date of Patent: Apr. 22, 2014

(54) CONTROL METHOD FOR VEHICLE DRIVE SOURCE OF HYBRID VEHICLE WHEN A TRANSMISSION MALFUNCTIONS

(75) Inventor: Seok Min Jeong, Gyunngi-do (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 305 days.

(21) Appl. No.: 13/309,889

(22) Filed: Dec. 2, 2011

(65) Prior Publication Data

US 2012/0309586 A1     Dec. 6, 2012

(30) Foreign Application Priority Data

Jun. 1, 2011  (KR) .................. 10-2011-0052849

(51) Int. Cl.
*B60W 10/00* (2006.01)
*B60W 10/04* (2006.01)
*B60W 30/18* (2012.01)

(52) U.S. Cl.
USPC ........................ 477/3; 477/111; 477/906

(58) Field of Classification Search
USPC ................................. 477/3, 111
See application file for complete search history.

(56) References Cited

U.S. PATENT DOCUMENTS 5,566,070 A * 10/1996 Mack et al. ............. 701/51
6,960,153 B2 * 11/2005 Ochiai et al. ........... 477/107
2006/0040791 A1 * 2/2006 Nakajima et al. ....... 477/111

FOREIGN PATENT DOCUMENTS

| JP | 2003097693 A | 4/2003 |
| JP | 2011046315 A | 3/2011 |
| KR | 1997-0003560 | 5/1995 |
| KR | 10-2002-0030363 | 4/2002 |
| KR | 10-2007-0062010 | 6/2007 |

* cited by examiner

*Primary Examiner* — Sherry Estremsky
(74) *Attorney, Agent, or Firm* — Edwards Wildman Palmer LLP; Peter F. Corless

(57) ABSTRACT

A system and method for controlling a power source when a transmission malfunctions in a hybrid vehicle is disclosed. In particular, a control unit confirms a speed of a transmission output is 0 rpms, detects whether the transmission is in park or neutral, and limits a speed of an engine and a motor in response to determining that the transmission is in park or neutral and that the transmission output is 0 rpms.

20 Claims, 3 Drawing Sheets

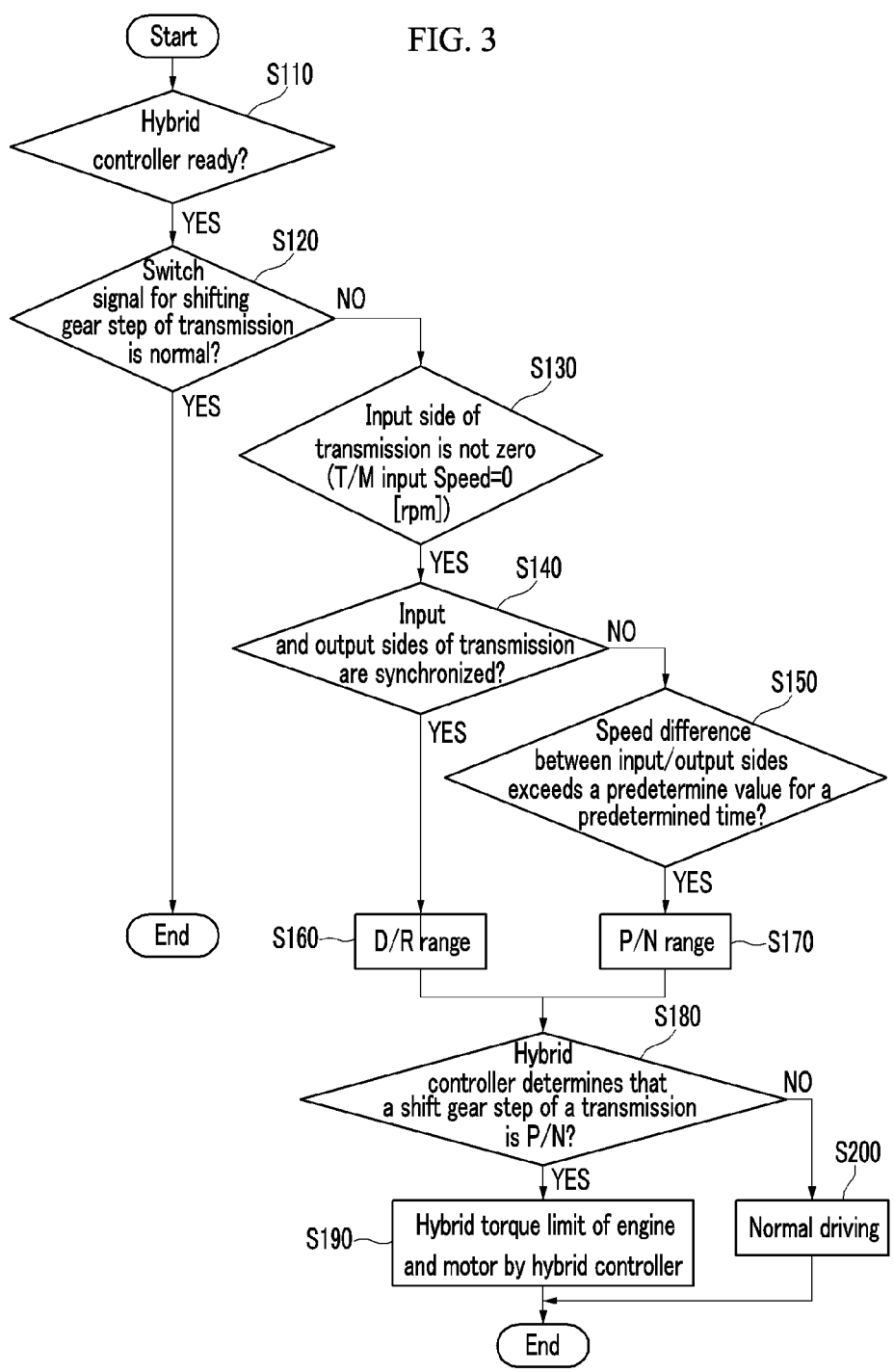

CONTROL METHOD FOR VEHICLE DRIVE SOURCE OF HYBRID VEHICLE WHEN A TRANSMISSION MALFUNCTIONS

CROSS-REFERENCE TO RELATED APPLICATION

This application claims priority to and the benefit of Korean Patent Application No. 10-2011-0052849 filed in the Korean Intellectual Property Office on Jun. 1, 2011, the entire contents of which are incorporated herein by reference.

BACKGROUND OF THE INVENTION (a) Field of the Invention

The present invention relates to a system and method for controlling a power source of a hybrid vehicle. More particularly, the present invention relates to a method for controlling an engine and a motor which prevents excessive torque when a transmission malfunctions.

(b) Description of the Related Art

Hybrid vehicles use an engine as well as a motor (often an electric motor) as a power source to be able to reduce exhaust gas and improve fuel consumption efficiency, and as shown in FIG. 1, an engine 10, a motor 30, and an automatic transmission 40 are sequentially disposed along one axis in the hybrid vehicle, a clutch 20 is arranged between the engine 10 and the motor 30, and a torsion damper 50 is connected between the clutch 20 and the engine 10. Also, an integrated starter-generator is disposed to apply ignition torque for starting an engine 10, and an ISG (integrated starter-generator) 70 is connected to a crank pulley of the engine 10 through a belt pulley 75.

The hybrid vehicle uses the motor 30 in a low speed or at early take off stages when a vehicle starts moving to obtain a driving torque, because the efficiency of the motor 30 is better than that of the engine 10 at the early stages of the movement. However, after the vehicle starts moving, the ISG 70 ignites the engine 10 so that the engine 10 and the motor can be simultaneously used. As stated above, the hybrid vehicle runs based on generally an EV (electric vehicle) mode that uses only torque from the drive motor and an HEV (hybrid electric vehicle) mode that uses torque from the engine as a main power source and torque from the drive motor as a auxiliary power source to provide drive power to the hybrid vehicle. The EV mode is changed to the HEV mode by an engine starting through the ISG. That is, the hybrid vehicle uses at least two motors 30 and clutches 20 to improve power performance or fuel consumption efficiency and the outputted power is transferred to a drive shaft of a vehicle through the transmission 40.

Here, a shift lever is connected to a manual valve inside a transmission through a cable, gear shifting from the transmission 40 is detected thereby, and this physical gear information is transferred to a TCU (transmission control unit) by a gear shift step switch that is disposed on a shift lever. An intention of a driver is determined by a gear shift step of the transmission and then gear shift control is performed. If, however, there is no electrical signals for a gear shift step signal transferred to the TCU or several signals are inputted, it is determined that the TCU is broken or has malfunctioned and performs a control thereby.

For example, if it is determined that there is a problem with a switch for shifting a gear, R (reverse) is maintained in an R step of the transmission, a third speed is maintained in a D step of the transmission, a P/N step is maintained in a P/N speed, and when an accelerator pedal sensor (APS) is turned on in a P/N condition, the engine control system maintains the engine speed at 4500 rpm for a predetermined time and then operates an engine over-heating prevention logic to maintain the engine speed at 3000 rpm through an engine speed limitation control.

However, when the APS is turned on in a P/N condition of the transmission, the motor/engine speed is increased or revved to a required speed limit thereby utilizing unnecessary fuel and creating an uncomfortable situation for the driver and a potentially dangerous situation.

The above information disclosed in this Background section is only for enhancement of understanding of the background of the invention and therefore it may contain information that does not form the prior art that is already known in this country to a person of ordinary skill in the art.

SUMMARY OF THE INVENTION

The present invention has been made in an effort to provide a system method for controlling a power source of an input side of a transmission when a gear shift step of a transmission malfunctions in a hybrid vehicle. The present invention has been made in another effort to provide a system and method for controlling a speed of an engine and a motor when a gear shift step of a transmission malfunctions in a hybrid vehicle, and to provide a system and method which prevents a sudden unintended acceleration, etc., by limiting an input torque after confirming that a gear shift step of a transmission is in a park/neutral state through logic that is configured to detect a park/neutral state of a transmission, when a gear shift step of a transmission malfunctions in a hybrid vehicle.

A method for controlling a power source gear shift step malfunctions in a transmission of a hybrid vehicle according to an exemplary embodiment of the present invention may include confirming, by a control unit which may include multiple controllers, that a speed of a transmission output is 0 rpms or not, detecting, by the control unit, that a transmission is in a park or neutral state, and controlling a speed of an engine and a motor when the gear shift step of the transmission is in a park or neutral state.

More specifically, an APS may be configured to compare an input speed and an output speed of the transmission, and confirm that the speed difference between the input speed and the output speed is greater than a predetermined value for a predetermined time.

Detecting that the transmission is in a park or neutral state may further include receiving a switch fail signal from a gear shift step from a transmission control unit (TCU) which is included in the control unit.

A power source for an engine may be eliminated when the gear shift step of the transmission is detected as P/N. The engine may be stopped and an engine clutch may be released when the power source for the engine is eliminated. The speed of the motor may be limited by speed limiting logic when a speed difference between the input and the output of the transmission exists. The speed limiting logic may limit an input speed of the transmission when the input speed of the transmission is greater than a predetermined value so that the speed cannot exceed a predetermined value. The speed limiting logic may perform proportional integral control (PI) control for the speed difference between the input and output of the transmission.

A torque request that is transferred to an input side of the transmission may be permitted when a park or neutral sate is not detected. The gear shift step of the transmission may be determined/detected to be in drive (D) or reverse (R) and the transmission in this case is normally operated when the speed at the input side and the output side of the transmission are synchronized.

The exemplary embodiment of the present invention improves safety of a vehicle by limiting an input torque of a transmission that is transferred from a power source of a vehicle when a switch for a gear shift step of a transmission of a hybrid vehicle determined to have malfunctions. Also, an exemplary embodiment of the present invention can guarantee safety of a vehicle and a driver from a sudden unintended acceleration or an unexpected condition. Further, an exemplary embodiment of the present invention can be applied to an electric vehicle as well as a hybrid vehicle.

BRIEF DESCRIPTION OF THE DRAWINGS

The above and other features of the present invention will now be described in detail with reference to certain exemplary embodiments thereof illustrated the accompanying drawings which are given hereinbelow by way of illustration only, and thus are not limitative of the present invention, and wherein:

FIG. 3 is a flowchart showing a method for controlling a speed of a power source of a vehicle according to an exemplary embodiment of the present invention.

Figure 1:
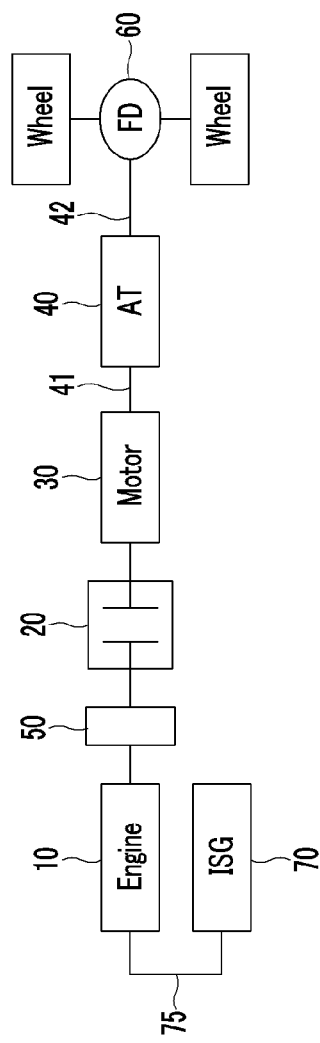
FIG. 1 is a schematic diagram showing a conventional configuration of a hybrid vehicle.

It should be understood that the appended drawings are not necessarily to scale, presenting a somewhat simplified representation of various preferred features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION OF THE EMBODIMENTS

An exemplary embodiment of the present invention will hereinafter be described in detail with reference to the accompanying drawings, so that a person having ordinary skill in the art pertinent to the present invention may easily carry out the present invention.

As those skilled in the art would realize, the described embodiments may be modified in various different ways, all without departing from the spirit or scope of the present invention.

It is understood that the term hybrid "vehicle" or "vehicular" or other similar term as used herein is inclusive of all hybrid motor vehicles in general such as passenger automobiles including sports utility vehicles (SUV), buses, trucks, various commercial vehicles, watercraft including a variety of boats and ships, aircraft, and the like, and includes parallel and series hybrid vehicles, semi-electric vehicles, plug-in hybrid electric vehicles, hydrogen-powered hybrid vehicles and other alternative combination type fuel vehicles (e.g. fuels derived from resources other than petroleum). As referred to herein, a hybrid vehicle is a vehicle that has two or more sources of power, for example both gasoline-powered and electric-powered vehicles.

The present invention relates to a system and a method for controlling a speed of an engine and a motor as a power source of a vehicle when a gear shift step of a transmission of a hybrid vehicle is malfunctioning. Particularly, since this invention relates to a method for preventing a speed of a motor 30 and an engine 10 from being increased to a limited value when APS is turned on in a park or neutral (P/N) condition, a separate control is not performed when the vehicle is determined to be in a drive or reverse (D/R) condition. For this purpose, it is determined whether the speed of the output side of a transmission is 0 rpms or not in an exemplary embodiment of the present invention. This is because the system and method of this invention is applied in a condition when the APS is ON.

For this, a condition that a gear shift step of a transmission is P/N has to be detected. Since there are at least two power sources of a vehicle including the motor 30 and the engine 10, the speed of the input side of a transmission is compared to that of the output side thereof so that a controller, e.g., a hybrid controller, can detect a P/N condition according to an exemplary embodiment of the present invention.

In the controller described above a P/N step detection logic is used to detect the P/N condition of a gear shift step of a transmission. The P/N is to satisfy a condition that the output side of the transmission is 0 rpm and the APS is 0%, the speed difference between the input side 41 and the output side 42 of the transmission is greater than a predetermined value, and the above conditions are maintained for a predetermined time. Also, it is detected that a fault signal of a switch for a gear shift step is transferred from a TCU to a hybrid controller (HCU) to detect the P/N step. The hybrid controller is an upper controller having a transmission control unit (TCU) as a transmission controller to control the overall torque of a hybrid vehicle.

The object of an exemplary embodiment of the present invention is to limit an excessive input torque of a motor when the switch for a gear shift step is malfunctioning and the transmission is in a P/N state. That is, the engine 10 is only operated in a P/N step, but the motor 30 is only operated when a switch for a gear shift step of a transmission is malfunctioning according to an exemplary embodiment of the present invention. Accordingly, an accelerator pedal is pressed to operate the APS so that the P/N state is confirmed by the control logic discussed above.

If (1) a speed of an output side 42 of a transmission is 0 rpm, (2) APS is operated (APS is greater than 0), (3) the speed difference between the input side 41 and the output side 42 of a transmission is greater than a predetermined value, and the above conditions are continued for a predetermined time, the TCU receives a signal that a switch for a gear shift step is faulty, the signal is transferred to the hybrid controller, and the hybrid controller recognizes the P/N state of the transmission.

As described above, when it is determined that the switch is faulty and the step of the transmission is a P/N condition, the speed of the power source of a vehicle is controlled as follows.

If the hybrid controller confirms that the vehicle is in P/N through P/N detection logic, the torque of the engine 10 that is transferred to the input side 41 of the transmission is eliminated. That is, the engine 10 is stopped and the engine clutch is released to eliminate the power source of the engine 10. Also, if the speed difference between the input side 41 and the output side 42 of the transmission exceeds a predetermined range, the motor torque without the engine torque is controlled by separate speed limiting logic.

In the above, the speed limiting logic controls the speed of the motor within a predetermined range, and more particularly, the logic controls the motor torque so that the motor does not exceed a predetermined RPM. If the speed difference between input and output sides 41 and 42 is within a predetermined range, the system is normally operated.

Figure 2:
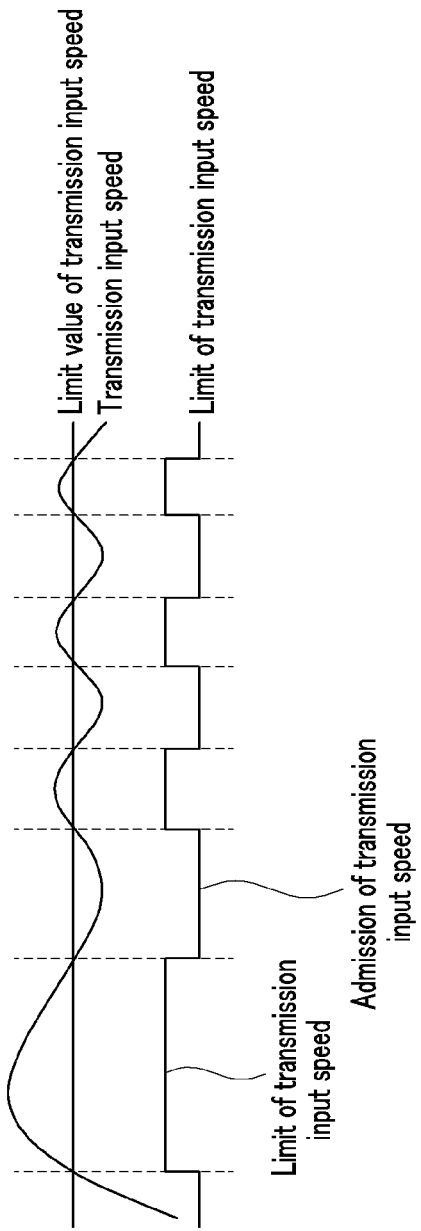
FIG. 2 is a graph showing a logic for limiting a transmission input speed according to an exemplary embodiment of the present invention.

FIG. 2 is a graph showing a logic for limiting a transmission input speed according to an exemplary embodiment of the present invention, and referring to FIG. 2, when the input speed of the transmission exceeds an input speed limit value of the transmission, the input speed limiting logic is applied to a PI control error of the input side and the output side 41 and 42 so that the input speed does not exceed the input speed limit value. That is, in FIG. 2, when the input speed of the transmission is greater than the input speed limit value of the transmission, the input speed of the transmission is limited, and when the input speed is less than the input speed limit value, the input speed of the transmission is permitted and the excessive torque of the motor is limited.

Also, if the transmission is not in P/N, the torque request that is transferred to the input side of the transmission is permitted. That is, the engine 10 torque is normally transferred to the input side and the motor 30 torque is normally transferred thereto.

Hereinafter, an exemplary embodiment of the present invention will be described with reference to FIG. 3.

FIG. 3 is a flowchart showing a method for controlling a speed of a power source of a vehicle according to an exemplary embodiment of the present invention. Firstly, a hybrid controller is prepared in S110, and it is determined whether a switch for a gear shift step of a transmission is normal or not in S120. If the switch for the gear shift step is normal, the system is normally controlled without a separate control. However, if there is no signal from the switch in the transmission or a signal from the switch is abnormal, the controller determines whether the transmission is in a P/N condition.

To do this, the accelerator pedal is pressed and when the input side of the transmission is greater than 0 and the APS is greater than 0% in S130, the controller determines whether the output speed and the input speed of the transmission are synchronized in S140, and if the output side is synchronized with the input side, the controller determines that the transmission is in D/R step in S160. If the transmission is in the D/R step, further separate control is not performed.

However, if the input side and the output side of the transmission are not synchronized and there is no relation between the transmission input side 41 and the output side 42, the controller determines whether the speed difference between the input side and the output side exceeds a predetermined value for a predetermined time in S150, and if the speed difference between the input side and the output side of the transmission is greater than a predetermined value for a predetermined time, the controller determines that the transmission is in the P/N state (e.g., TCU (i.e., a second controller, may in some embodiments be configured to detect P/N state of the transmission) in S170.

If the TCU detects the state of the transmission, the condition is transferred to the hybrid controller and the P/N condition is determined by the hybrid controller in S180. If the hybrid controller determines that the transmission is in a P/N state, the operation of the engine is stopped and the torque of the motor is limited by the speed limiting logic in S190 such that the excessive torque is not transferred from a power source to the input side of the transmission when the switch for a gear shift step malfunctions.

Furthermore, the control logic of the present invention may be embodied as computer readable media on a computer readable medium containing executable program instructions executed by a processor, controller or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion.

Accordingly, the quality and safety of the vehicle are improved and the driver's discomfort is reduced. If the transmission is not in the P/N step, the vehicle is normally operated in S200.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

DESCRIPTION OF SYMBOLS

10: engine
20: clutch
30: motor
40: transmission
41: transmission input side
42: transmission output side
50: torsion damper
60: drive shaft
70: ISG
75: belt pulley

What is claimed is:

1. A method for controlling a power source in breakdown of a gear shift step of a hybrid vehicle, comprising:
   confirming, by a control unit, that a speed of a transmission output is 0 rpms;
   in response to confirming that the transmission output is 0 rpms, determining, by the control unit, whether a transmission is in park or neutral; and
   in response to determining that the transmission is in park or neutral, limiting, by the control unit, a speed of an engine and a motor.

2. The method for controlling a power source of claim 1, wherein determining further comprises:
   operating an accelerator pedal sensor (APS);
   comparing an input speed and an output speed of the transmission; and
   confirming that the speed difference between the input speed and the output speed is greater than a predetermined value for a predetermined time.

3. The method for controlling a power source of claim 2, wherein determining further comprises receiving a switch fail signal of a gear shift step from a transmission control unit (TCU).

4. The method for controlling a power source of claim 2, further comprising limiting the speed of the motor by speed limiting logic when the speed difference between the input side of the output side of the transmission occurs.

5. The method for controlling a power source of claim 4, further comprising limiting an input speed of the transmission when the input speed of the transmission is greater than a predetermined value such that the speed cannot exceeds a predetermined value.

6. The method for controlling a power source of claim 5, further comprising performing proportional integral control (PI) control for the speed difference of the input side and the output side of the transmission.

7. The method for controlling a power source of claim 2, wherein the transmission is determined to be in drive or reverse and the transmission normally operated when the speed of the input side and the output side of the transmission are synchronized.

8. The method for controlling a power source of claim 1, further comprising eliminating a power source for the engine when the transmission is determined to be in park or neutral.

9. The method for controlling a power source of claim 8, further comprising stopping the engine and releasing an engine clutch when the power source for the engine is eliminated.

10. The method for controlling a power source of claim 1, further comprising permitting a torque order to be transferred to an input side of the transmission, when it is determined that the transmission is not in park or neutral.

11. A system comprising:
  an engine;
  a motor;
  a control unit configured to confirm, by at least one controller in the control unit, that a speed of a transmission output is 0 rpms, determine whether a transmission is in park or neutral in response to confirming that the transmission output is 0 rpms, and limit a speed of the engine and the motor in response to determining that the transmission is in park or neutral.

12. The system of claim 11, wherein the control unit is further configured to:
  operate an accelerator pedal sensor (APS);
  compare an input speed and an output speed of the transmission; and
  confirm that the speed difference between the input speed and the output speed is greater than a predetermined value for a predetermined time.

13. The system of claim 12, wherein the control unit is further configured to receive a switch fail signal of a gear shift step from a transmission control unit (TCU). engine and release an engine clutch when the power source for the engine is eliminated.

14. The system of claim 12, wherein the speed of the motor is limited by speed limiting logic when the speed difference between the input side of the output side of the transmission occurs.

15. The system of claim 14, wherein the speed limiting logic limits an input speed of the transmission when the input speed of the transmission is greater than a predetermined value such that the speed cannot exceeds a predetermined value.

16. The system of claim 12, the transmission is determined to be in drive or reverse and the transmission normally operated when the speed of the input side and the output side of the transmission are synchronized.

17. The system of claim 11, wherein a power source for the engine is eliminated when the transmission is determined to be in park or neutral.

18. The system of claim 17, wherein the control unit is configured to stop the engine and release an engine clutch when the power source for the engine is eliminated.

19. The system of claim 11, wherein a torque request that is transferred to an input side of the transmission is permitted, when it is determined that the transmission is not in park or neutral.

20. A computer readable medium containing executable program instructions executed by a controller, comprising:
  program instructions that confirm that a speed of a transmission output is 0 rpms,
  program instructions that determine whether a transmission is in park or neutral in response to a confirmation that the transmission output is 0 rpms, and
  program instructions that limit a speed of the engine and the motor in response to a determination that the transmission is in park or neutral.

* * * * *